June 7, 1960

W. PAUL ET AL 2,939,952

APPARATUS FOR SEPARATING CHARGED PARTICLES
OF DIFFERENT SPECIFIC CHARGES

Filed Dec. 21, 1954

INVENTORS
WOLFGANG PAUL
HELMUT STEINWEDEL

By Ostrolenk & Faber

ATTORNEYS

United States Patent Office 2,939,952
Patented June 7, 1960

2,939,952
APPARATUS FOR SEPARATING CHARGED PARTICLES OF DIFFERENT SPECIFIC CHARGES

Wolfgang Paul and Helmut Steinwedel, Bonn, Germany; said Steinwedel assignor to said Paul Filed Dec. 21, 1954, Ser. No. 476,812

Claims priority, application Germany Dec. 23, 1953

17 Claims. (Cl. 250—41.9)

The invention relates to methods of separating or separately detecting charged particles of different specific charges.

Such arrangements may be employed in the usual manner for mass-spectroscopy and isolation of isotopes, further as pressure-gauges for measuring partial pressure of the components of highly thinned gas mixtures, to determine leakes in vacuum apparatus, to analyze traces and to measure small vapor pressure, particularly in gas mixtures. In the past ion separating devices which offer both high accuracy and high intensity measurements have been extremely expensive and complex in view of the physical principles upon which their operation is based.

The method of the invention utilizes an electric field which is periodical in time but which does not serve for measuring a transit time or the velocity of the ions and is characterized in that the potential of the electric field is a quadratic function of the co-ordinates $x$, $y$, $z$. The most general such potential is defined by the equation:

(1) $\quad \varphi(x,y,z,t) = f(t) \ (\alpha x^2 + \beta x^2 - \gamma z^2)$

Here $f(t)$ is an arbitrary periodic function of the time $t$. Because of the Laplacian $\Delta \varphi = 0$ the constants $\alpha$, $\beta$ and $\gamma$ have to satisfy the equation $\alpha + \beta = \gamma$. When ions are brought into such a field, their equations of motion are differential equations with periodical coefficients, the equations being characterized by having ranges of stable and unstable solutions. Thus, there exist two different kinds of ion paths; either the ions perform oscillations around the centre of symmetry of the field, the amplitudes of the oscillations remaining smaller than a certain maximum value (stable paths), or the amplitudes of the oscillations increase extremely rapidly so that, within a very short time, the particles impinge on the field generating electrodes and are thus removed (unstable paths). When the field and the dependence on the time $f(t)$ are given, the specific charge of a particular ion will determine whether it travels along a stable or unstable path. In particular, the stability or instability of the paths is independent of the point of origin and of the direction and magnitude of the initial velocity of the ion. If $e/m$ of the ion lies in a stable range, then all its possible paths are stable and, conversely, if $e/m$ of the ion lies in an unstable range, then all its possible paths are unstable. The positions and widths of the stable ranges of the specific charge can be varied within very wide limits solely by varying the amplitude, frequency and/or shape of the field creating voltages which determine the function $f(t)$.

The invention will be more clearly understood from the following description when taken in connection with the drawings, in which:

Fig. 1 illustrates electrodes for use in carrying out the present invention;

Fig. 2 diagrammatically illustrates a longitudinal cross section through a structure which operates in accordance with the present invention;

Figure 1:
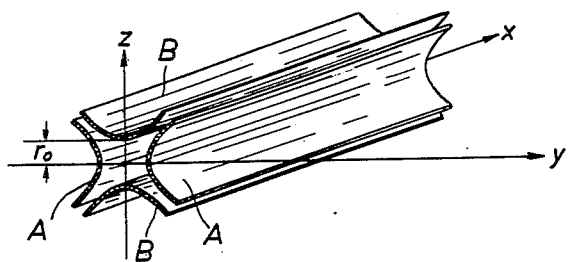

A table of symbols to be used in the foregoing is as follows:

$e$ = ionic charge
$m$ = ionic mass
$M$ = mass number
$eV$ = Electron volt
$x,y,z$ = Coordinate axes of a rectangular system of co-ordinates
$\varphi$ = potential
$f(t)$ = periodic function of time
$r_0$ = distance of the electrodes from the center of the symmetry axis
$U_B$ = accelerating potential
$U_0$ = direct voltage
$V$ = amplitude of an alternating voltage
$f, \nu$ = frequency
$W = 2\pi f$ = cyclic frequency
$\dot{x}$ = derivative of $x$ with respect to time (velocity in $x$-direction)
$\ddot{x}$ = second derivative of $x$ with respect to time (acceleration in $x$-direction)
$E_x$ = electric field strength
$Z_\zeta$ = variable in the Matthieu differential equation
$a,q,A,B$ = constants in the solution of the Matthieu equation
$\mu$ = magnitude resulting from $a$ and $q$ $\sum_{-\infty}^{+\infty} n$ = sum of all $n$ series elements, for $n$ from minus infinity to plus infinity $c_n$ = constants assigned to the individual series elements
$i = \sqrt{-1}$, imaginary unit
$e$ = base of the natural log system
$L$ = length of electrodes
$v$ = ion speed
$\tau$ = high frequency period
$\delta$ = angular aperture
$\Delta$ = difference
$\Delta$ = LaPlace's operator In all the drawings the same reference numerals indicate corresponding parts.

The electrodes of Fig. 1 serve to create a cylindrically symmetrical electric field. The arrangement comprises four electrodes A, A, B, B of hyperboloidal shape, the electrodes being arranged at the distance $r_0$ from the $x$-axis. The two electrodes A are electrically interconnected, and the electrodes B are electrically interconnected. A time-periodical voltage $U = U_0 + V \cos \omega t$ is applied on the pairs of electrodes A and B, whereby an electric field is created having a potential $\varphi = (U/r_0^2)(y^2 - z^2)$. This field is independent of $x$, its centre of symmetry being the $x$-axis. In this case $\alpha = 0$ in Equation 1.

Figure 2:
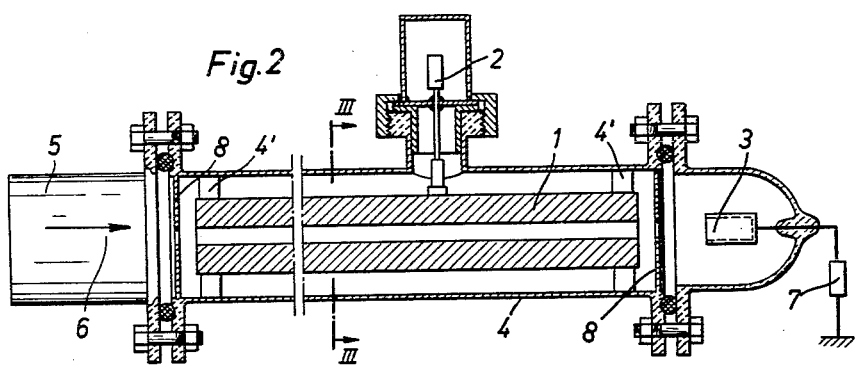
Figure 3:
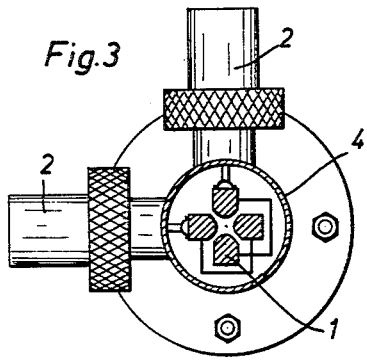
Fig. 3 illustrates a section along the line III—III of Fig. 2.
Figure 4:
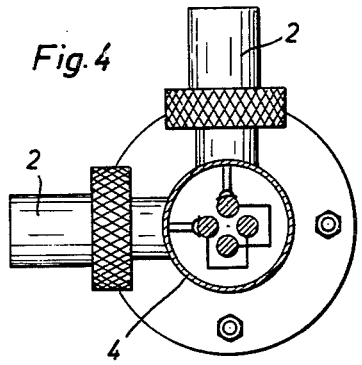
Fig. 4 is a similar cross-section to that of Figure 3 and illustrates differently shaped electrodes.

Figs. 2 and 3 show an arrangement comprising a vessel 4, which can be evacuated and in which electrodes 1 are provided with facing surfaces which are of hyperboloidal shape similar to those of the electrodes of Fig. 1, but for ease of manufacture the electrodes are not hollow but solid. However, instead of the electrodes shown in Figs. 2 and 3, electrodes of the shape shown in Fig. 1 could alternatively be used. Furthermore, for manufacturing reasons it may be preferable to employ four circularly cylindrical electrodes as shown in Fig. 4 for creating the cylindrically symmetrical electric field with sufficient approximation, the radius of the electrodes of Fig. 4 equalling the radius of curvature of hyperboloidal electrode surfaces at the vertices. In any case, the electrodes are mounted by, and spaced from one another by discs 4' of ceramic material. While the electrodes are shown as being fixed, it is to be understood that they could be adjustably mounted. A voltage U is placed between pairs of opposite electrodes by means of leads 2 passing through the wall of the vessel 4 in a vacuum-tight manner. A conventional ion source 5 (such as an electron impact source or a low-voltage arc discharge), is connected to the vessel 4 in a vacuum-tight manner by means of flanges to generate ions to be separated in the direction of the arrow 6 and into the space between the electrodes 1 with a kinetic energy $eU_B$. The ions are separated in accordance with their stability between the electrodes. The ions that have stable paths can travel through the electric field and are collected by a cup-shaped collecting electrode 3. An electrically insulated lead from the collecting electrode 3 passes in a vacuum-tight manner through the wall of the vessel 4 (for example, the lead may be taken through a sealing boss). The charge on the collecting electrode 3 flows through a resistor 7 to earth and the voltage thereby created across the resistor 7 is measured. Two circular diaphragms 8 respectively screen the source 5 of ions and the collecting electrode 3 against the high-frequency electric field between the electrodes 1.

Figure 5:
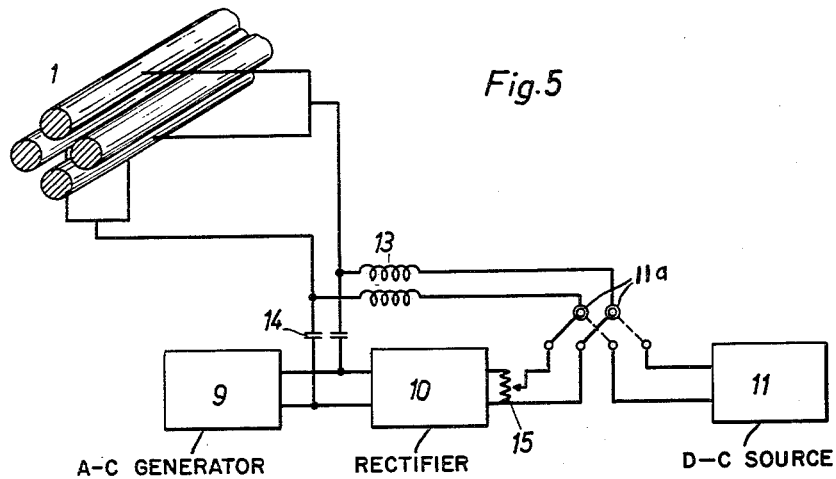
Fig. 5 is a circuit diagram showing the external connections of the electrodes of Figures 3 and 4.

Fig. 5 illustrates how voltage supply sources are coupled to the electrodes 1. An electric generator 9 creates a high-frequency voltage $V \cos \omega t$ which is applied to the electrodes 1 through the two capacitors 14. Moreover, the high frequency voltage is rectified and smoothed by a rectifier 10. The direct voltage so created is divided by a potentiometer 15 and is also fed to the electrodes 1 through choke coils 13, the direct voltage being $U=uV$. Therefore, the ratio $u$ of the direct voltage U to the alternating voltage V is substantially independent of alterations of the alternating voltage. Alternatively, a direct current voltage may be supplied to the electrodes 1 by an independent direct voltage source 11 and an electric two-way switch 11a.

The arrangement described operates as follows:
In the electric field having the potential $$\varphi = (U(t)/r_0^2)(y^2 - z^2)$$

the electric force is $$E_x = 0; \quad E_y = (2U/r_0^2)y; \quad E_z = -(2U/r_0^2)z$$

When U is an alternating voltage corresponding to the equation $U = V \cos \omega t$, the equations of motion of an ion are as follows:

(2) $$\begin{cases} m\ddot{x} = 0, \\ m\ddot{y} - (2eV/r_0^2)\, y \cos \omega t = 0, \\ m\ddot{z} + (2eV/r_0^2)\, z \cos \omega t = 0. \end{cases}$$

On integration, the first equation leads to $\dot{x} = $ constant. That is to say, the ion travels in the x-direction with a constant speed. The other two equations are specific cases of the Matthieu differential equation which, in its general form, is as follows:

(3) $$d^2z/d\xi^2 + (a - 2q \cos 2\xi)z = 0$$

The general solution of this equation is as follows:

$$z = Ae^{\mu\xi}\sum_{-\infty}^{+\infty}nc_n e^{+in\xi} + Be^{-\mu\xi}\sum_{-\infty}^{+\infty}nc_n e^{-in\xi}$$

Figure 6:
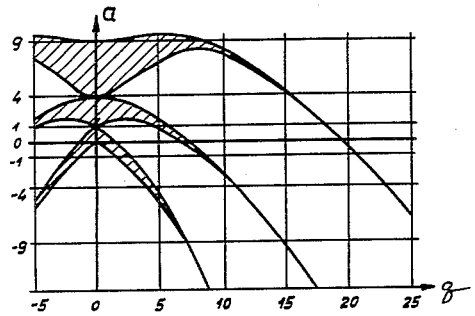
Figs. 6, 7, 8 and 9 are diagrams showing the relationship between various parameters in the operation of the novel invention.

From this it will be recognized that two different kinds of solutions exist. If the characteristic exponent $\mu$, which can be computed from $a$ and $q$, is imaginary, the solution remains finite for all values of $\xi$. If, however, $\mu$ is real or complex, the amplitude increases exponentially and the path is unstable. Whether the solution is stable or unstable depends only on the value of the parameters $a$ and $q$, but is independent of the initial values $z_0$ and $\dot{z}_0$ of $z$. Fig. 6 illustrates the stable ranges in the $a$, $q$—plane, the stable ranges being shaded.

From a comparison of Equation 2 with Equation 3, it will be seen that in the present case (4) $$a = 0; \quad q = 4eV/r_0^2 m\omega^2; \quad \xi = \omega t/2$$

Thus the ions may be located at any arbitrary point of the q-axis of the diagram of Fig. 6.

Figure 7:
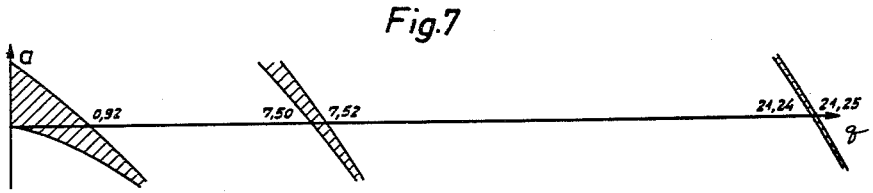

Fig. 7 illustrates the vicinity of the q-axis. For clarity, the higher ranges are shown exaggerated. From $q=0$ to $q=0.92$, the ion is in a stable range; from $q=0.92$ to $q=7.50$, it is in an unstable range; from $q=7.50$ to $q=7.52$, it is again in a stable range; and so on.

When the alternating voltage and the frequency are given, the value of $e/m$ determines in which range the ion is located, as can be seen from Equation 4.

Figure 8:
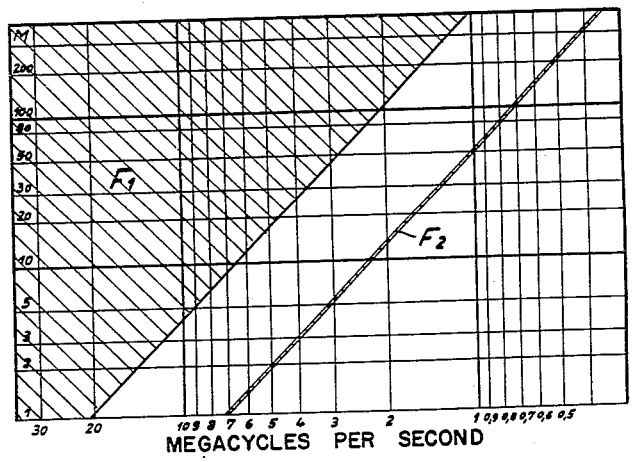

For an alternating voltage of 1000 volts, the first two stable ranges $F_1$ and $F_2$ are shown in a M, $\nu$-diagram in Fig 8, the stable ranges being shaded (M being the mass number defined by $m=m_0 M$ and $\nu$ being the frequency). From this the following can be recognized: when an ion beam comprises ions of different masses, and when the alternating voltage and frequency are given, then in the first range the only ions that can pass through the field are those having masses which are greater than $$Mm_0 = 4eV/0.92 r_0^2 \omega^2$$

In the second range, only a finite mass interval $$\Delta m = m\Delta q/q$$

can pass. Since for the second range $\Delta q/q$ equals approximately 1%, isotopes of comparatively small masses can be separated. Here it is somewhat disturbing that a mass continuum of the first range is superimposed on the second range. From the third range onwards $\Delta q$ is very small so that very good resolution can be expected. However, these ranges can hardly be used because the intensities are too small. As can be verified by computation, the initial energies of the ions in the y- and z-directions must not exceed the value $10^{-6}$eV in the third range.

When a direct voltage is superimposed on the alternating voltage; that is to say when $U = U_0 + V \cos \omega t$, only a small mass interval $\Delta M$ can pass in the first range. The equations of motion now read as follows:

(5) $$\begin{cases} \ddot{y} - (2e/mr_0^2)(U_0 + V \cos \omega t)y = 0 \\ \ddot{z} + (2e/mr_0^2)(U_0 + V \cos \omega t)z = 0 \end{cases}$$

Figure 9:
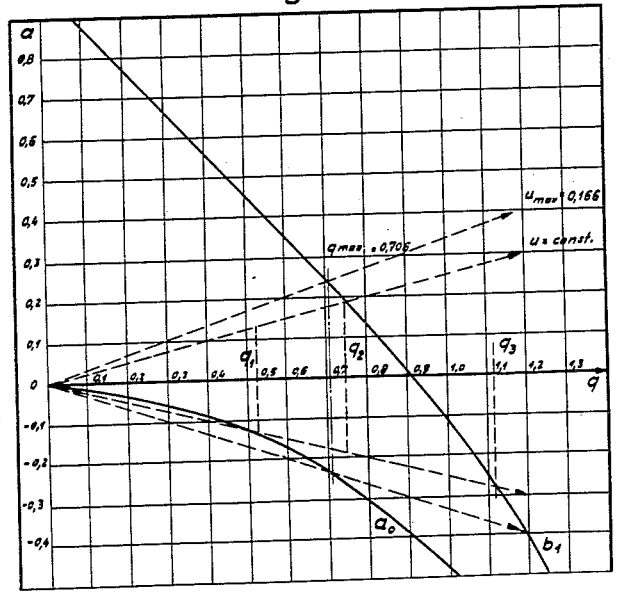

A comparison of Equation 5 with Equation 3 shows that $$a_y = -8eU_0/r^2 m\omega^2; \quad a_z = 8eU_0/r_0^2 m\omega^2$$

while $q = 4eV/r^2 m\omega^2$ holds for both directions of movement. The ratio $a/q = \pm 2U_0/V$ depends only on the direct voltage and the alternating voltage, but does not depend on the frequency and ion mass. In the $a$, q-diagram, the lines $u = U_0/V = a/2q$ are rectilinear lines starting at the origin and lying symmetrically to the q-axis. In Fig. 9, a section of the first range of stability and a pair of rectilinear lines $u=$const., are shown. The half plane $a<0$ corresponds to the y-direction and the half plane $a>0$ corresponds to the z-direction.

Assuming that the amplitude and frequency of the alternating voltage are kept constant, all the masses will lie on the rectilinear lines $u=$const. The mass $m_1$ corresponds to the value $q_1$, $q_2 \hat{=} m_2$ and $q_3 \hat{=} m_3$. In the y-direction, only the masses from $m_1$ to $m_3$ fall into a stable range, and in the z-direction, only masses exceeding $m_2$ fall in a stable range. Since an ion can pass through the electric field only if it is stable in the y-direction as well as in the z-direction, the result is that only a mass interval $\Delta m = m_1 - m_2$ can pass through the field. When the direct voltage is increased, the angle between the rectilinear lines and the q-axis is increased whereby the pass range is narrowed. For the ratio $U_0/V = 0.166$, an infinitely small range results in the limiting case. Above this value no ion can pass through the field. In this case, q assumes the value $q_{max} = 0.706$. The width of the stable range in dependence on the direct voltage is obtained from the points of intersection of the rectilinear lines $u$=const. with the limiting curves of the first range of stability. In the vicinity of the point $q=q_{max}$ it is $$\Delta \approx 4(0.236 - 1.410u)$$

At constant field quantities, this corresponds to a mass range $$\Delta m = 4mq^{-1}(0.236 - 1.410u)$$

From this, the theoretical mass resolution can be computed as a function of the quantity $u$ as $$m/\Delta m = (1/2)(v/\Delta v) = 0.75/(1 - u/u_{max})$$

In the foregoing, it has been assumed that the electric field is infinitely long in the x-direction since only for $t \to \infty$ the amplitudes of the unstable ion paths approximate $\infty$. In practice, however, it is sufficient to postulate that the ions are subjected to so many alternations of the electric field that the amplitudes of the unstable paths increase sufficiently for the ions to impinge on the electrodes creating the electric field. Thus, it is only necessary to make the length L of the electric field great enough that the time that the ions are within the field is large as compared to the duration of a single high-frequency period. This time is $\tau = L/v$ when the velocity of the ions is $$v = \sqrt{2eU_B/m}$$

$U_B$ being the accelerating voltage. This expression has to be great as compared with $1/v$. That is to say;

$$L > r_0 \pi \sqrt{2U_B q/V}$$

For $L = 50$ cm., $r_0 = 0.5$ cm. and $V = 1000$ volts, the number of field alternations is $n = 850\sqrt{U_B}$. 100 V-ions are therefore subjected to 85 field alternations, and 1000 V-ions to only 25, so that the amplitudes of the wrong masses will clearly increase to such an extent that they cannot reach the collecting electrode.

Figure 10:
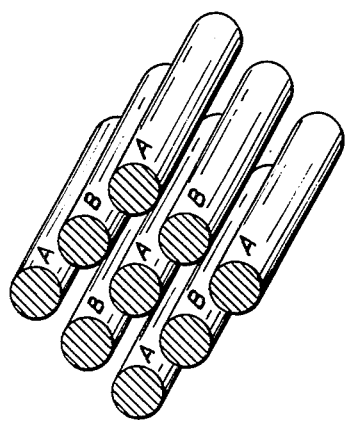
Fig. 10 illustrates a modified electrode arrangement for use in accordance with the present invention.

From the foregoing it will be seen that the cylindrically symmetrical arrangement can be used as a mass spectrometer having an adjustable pass range and as an isotope separator. The arrangement using circularly cylindrical electrodes allows a convenient, material-saving and energy-saving multiplication of the separating arrangement in order to obtain high intensities, wherein circularly cylindrical electrodes are effective in a plurality of individual arrangements. Fig. 10 illustrates electrodes forming such an assembly of circularly cylindrical electrodes A and B; all the electrodes A being electrically connected and all the electrodes B being electrically connected.

Figure 11:
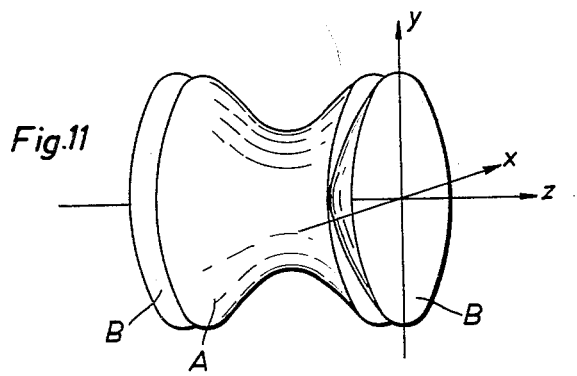
Fig. 11 illustrates still another such electrode arrangement.

Fig. 11 shows another construction of the electrodes. In this case, the potential is $$\varphi = (U/r_0^2)(x^2 + y^2 - 2z_0^2)$$

thus, in Equation 1 it is for this case $$\alpha = \beta = 1/2\gamma$$

Figure 12:
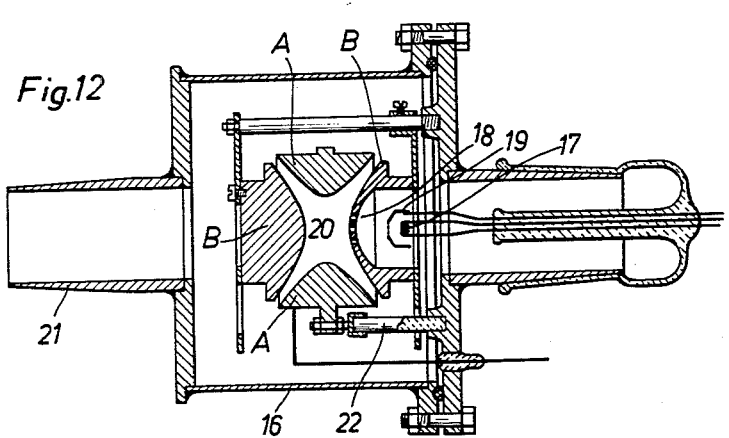
Fig. 12 illustrates a longitudinal section through an arrangement employing electrodes similar to those of Fig. 11.

Fig. 12 illustrates a section through an arrangement using the electrodes of Fig. 11. The electric field is created by three electrodes A, B, B, the adjacent surfaces of the three electrodes forming a one-part hyperboloid of revolution and a two-part hyperboloid of revolution, the assymptotic cones having an apex angle $\delta$ of 109.47° (tan $(\delta/2) = \sqrt{2}$). The electrodes B are conductively interconnected and a time periodical voltage U is applied between the electrode A and the pair of electrodes B. The electrodes are arranged in a vessel 16, which can be evacuated through a tube 21, leads to the electrodes passing through the wall of the vessel 16 in a vacuum-tight manner in which the electrode A is held by an insulating support 22. For creating ions in the space between th electrodes, a gas to be tested is introduced into the arrangement at a low pressure. An incandescent cathode is indicated by reference numeral 17. Electrons emitted by the cathode 17 pass into the space between the electrodes through holes 18 in one of the electrodes B. An electrode 19 is provided for focusing the electrons, and is negatively biased relative to the cathode 17. The electrons ionize the gas in the ionization space 20 between the electrodes.

When, a potential $U_0 + V \sin \omega t$ is applied between the electrode A and the pair of electrodes B, ions of the stable $e/m$=range remain between the electrodes while ions of the unstable range impinge on the electrodes. The ions with unstable paths then represent an ohmic charge in the high frequency circuit while the ions with stable paths represents an inductive charge since they do not contribute to the flow of current. By well known means such as electronic power factor meters, the inductive load and hence the stable ions could be easily determined. It is also possible to increase the accuracy of measurement if a narrow unstable band is embedded in the stable band. This can be accomplished by superimposition of an addiitonal alternative current. The feeding of the auxiliary voltage is accomplished in any desired manner customary in high frequency technique for superimposition of two voltages. This rotationally symmetrical arrangement can be used as a mass spectrometer.

In connection with both field arrangements, namely the cylindrically symmetrical arrangement of Fig. 2 and the rotationally symmetrical arrangement of Fig. 12, the sinusoidal periodicity is only one possible form of oscillation. The method may alternatively be performed by using oscillations of different forms. The position of the stable and unstable ranges is hardly affected by the form of the oscillations.

The arrangements of the invention are distinguished from other arrangements using a high frequency electric field since in the present case this field is not utilized for measuring a transit time of the ions. Consequently, the present arrangements are independent of the phase at which the ions enter the electric field so that the arrangements of the invention do not require impulsing and the separation of ions of different specific charges may be effected continuously.

The arrangements of the invention are furthermore distinguished from the previously suggested arrangement by the feature that the static electric field (that is to say the time mean value of the time-periodical field) is only an auxiliary field for varying and narrowing the stable range, but is not required for causing the ions to oscillate harmonically as in the case with the previously suggested method. Consequently, in the method of the present invention the direct voltage is considerably lower than the peak value of the high frequency alternating voltage while conversely in the previous method the alternating voltage had to be considerably lower than the direct voltage. Moreover, no magnetic field for additionally focusing the ions is required since, averaging over the time, no de-focusing forces act on the ions in the stable range. The advantages of the invention as compared with the known methods are essentially the following:

(1) A great simplification of the necessary apparatus is achieved. Since the method only requires an electric alternating field of moderate voltage and frequency, the required apparatus may be much simpler than the apparatus previously required.

(2) An independence from the initial condition is achieved. Since the operation of the arrangement is independent of the direction and the value of the initial velocity of the ions, ion sources may be used which create ions of highly different velocities without thereby impairing the resolution, that is to say the accuracy of separation. The resolution is defined for ions of known charge by the expression $m/\Delta m$, $m$ being the mass of the ions to be detected and $\Delta m$ the mass difference between other ions which can be separated from the ions to be detected. Since with most of the known methods only ions within narrow ranges of directions and velocities can be used for the measurement, a considerable gain of intensity results in comparison with those methods so that the requirements on the sensitivity of the detecting means may be considerably lowered. High intensities (that is to say high ion currents) are of especial advantage in arrangements for separating isotopes.

(3) A convenient control is achieved of the position and width of the stable and unstable ranges by only varying the frequency, amplitude and/or shape of the field-creating voltages. Thus, in an arrangement, after it has been set up, the measuring range and the accuracy may yet be varied within wide limits.

The advantages of the arrangement as compared with transit-time spectrometers are especially the following:

(4) Since the present method is independent of the initial conditions (see paragraph 2 above) it is not necessary to use impulsing or to comply with phase conditions.

(5) It is easily achieved that of ions of a known charge only those of a well defined mass are recorded. Disturbances by masses which are multiplied or divided by 2, $\sqrt{2}$, or the like, can be avoided without difficulty.

(6) Ions in the stable range are not affected in any direction by defocusing forces when averaging over the time; thus additional magnetic fields for focusing the ions are not required.

The methods of the invention may find many applications such as:

I. Use for mass analysis: Since, as indicated above, by means of the present methods ions of different specific charges can be separated or separately detected, the methods may be employed for constructing a mass spectrometer. Suitable for this purpose are the cylindrical symmetrical, as well as the rotationally symmetrical electric fields described hereinbefore.

II. Use for separating isotopes: Since, as explained above, the present procedure allows high intensities (that is to say high ion currents), it may be employed for constructing plants for separating isotopes. For this purpose the cylindrical symmetrical electric field is particularly suitable.

III. Use as a pressure gauge for measuring partial pressures of components of highly rarified gas mixtures: For example, the ionized gas mixture is introduced into the rotationally symmetrical field; individual components of the mixture are successively detected or quantitatively measured by correspondingly displacing the ranges of stability and instability. The advantages of such a pressure gauge as compared with hitherto usual pressure gauges are, amongst others, the compactnses of the arrangement (linear dimensions of a few centimeters are sufficient) and the possibility of easy heating (the arrangement consists essentially of three metal electrodes).

IV. Use for finding leakages in vacuum devices: The vacuum device is introduced into an atmosphere which contains traces of gases usually not contained in the air. If such traces enter into the vacuum devices through a leakage it is easy to detect the same by means of a pressure gauge in the manner explained in the preceding paragraph III.

V. Separating gas mixtures as well as mixtures of liquids and solids in the vapour phase: The gas or vapour mixtures are ionized and separated by a cylindrically symmetrical field similarly as explained in paragraph II with respect to isotopes. An advantage of this method as compared with separation by distillation or sublimation resides in the feature that the mixture can be separated even if two or more components of the mixture have the same vapour pressure or the same boiling point.

VI. Use for analysing traces: The mass spectrometer described in paragraph I may also be employed for analysing traces.

VII. Use for measuring low vapour pressures especially of mixtures: The pressure gauge described in paragraph II may be employed also for measuring low vapour pressures.

What we claim is:

1. An arrangement for separating ions having different specific charges, comprising an evacuated vessel, electrode means for creating an electric field in the space between them positioned in said vessel, adjacent surfaces of said electrode means having a hyperboloidal shape, means for holding said electrode means in spaced relation, means for generating a voltage having an arbitrary periodical function of time $f(t)$, means for supplying said voltage to said electrode means and thereby creating a time-periodical field the potential of which is general quadratic function $$\varphi = f(t)\ (\alpha.x^2 + \beta.y^2 - \gamma.z^2)$$

of the rectangular coordinates $x$, $y$, $z$ of the electrode arrangement, $\alpha$, $\beta$ and $\gamma$ being constants satisfying the equation $\alpha + \beta = \gamma$, means for creating charged ions in said evacuated vessel, the said ions being introduced into said field whereby, caused by the electrostatic forces of the field executed on the ions, certain ions perform oscillations of a limited amplitude, the others, oscillations of an increasing amplitude depending on their respective specific charges and therefore follow stable and instable paths, respectively, and are thereby separated.

2. An arrangement as claimed in claim 1, wherein said means for generating a voltage having an arbitrary periodical function of time $f(t)$ generates a substantially sinusoidal high frequency voltage.

3. An arrangement as claimed in claim 1, additionally comprising means for deriving a first direct current voltage from said periodical voltage, means for generating a second direct current voltage, and means for alternatively switching one of said direct current voltages in parallel to said periodical voltage supplied to said electrode means.

4. An arrangement as claimed in claim 3, comprising means for varying the ratio between the amplitude of said periodical voltage and said first direct current voltage and thereby varying the range of stable ion paths.

5. An arrangement for separating ions having different specific charges, comprising, in combination, an evacuated vessel, four parallel electrodes for creating a cylindrically symmetrical electric field in the space between them, the said electrodes being arranged in said vessel, adjacent surfaces of said electrodes having a hyperboloidal shape and pairs of said electrodes being conductively interconnected, means for holding said electrodes in spaced relation, means for generating a voltage being an arbitrary periodical function $f(t)$ of time, means for supplying said voltage to said electrodes and thereby creating a time-periodical cylindrically symmetrical field the potential of which is a quadratic function $$\phi = f(t).(y^2 - z^2).\frac{1^2}{r^4}$$

of the rectangular coordinates $x$, $y$, $z$ of the electrode arrangement; the $x$-axis being laid into the axis of symmetry, and $r_0$ being the distance of the electrode surfaces from the $x$-axis, a conventional ion source being arranged in said vessel, means for introducing ions delivered from the said ion source into the said cylindrically symmetrical time-periodical field in direction of said symmetry, means for collecting the ions having followed stable paths through said field between said electrodes, said collecting means being arranged in said vessel, means for screening the said ion source and the said collecting means with respect to the said vessel, and means for measuring a current resulting from the charged ions collected by the said collecting means by measuring the voltage drop created by the said current in a resistor.

6. An arrangement as claimed in claim 5, wherein said four electrodes have adjacent surfaces of a cylindrical shape, the radius of said surfaces equalling the radius of curvature of the hyperboloidal surfaces at the vertices.

7. An arrangement as claimed in claim 5, wherein said ion source and said collecting means are arranged in separate housing, said housing being connected with said vessel in a vacuum-tight manner.

8. An arrangement for separating ions having different specific charges comprising, in combination, an evacuated vessel, a plurality of parallel electrodes for creating cylindrically symmetrical electric fields between each four of them, the said electrodes being arranged in said vessel, adjacent surfaces of said electrodes having a cylindrical shape and pairs of said electrodes being conductively interconnected, means for holding said electrode means in spaced relation, means for generating a voltage being an arbitrary periodical function $f(t)$ of time, means for supplying said voltage to said electrode means and thereby creating a plurality of time-periodical cylindrically symmetrical fields, the potentials of which are identical quadratic functions $$\phi k = f(t)(y_k^2 - z_k^2)\frac{1}{r_{0k}^2} k = 1, 2, 3$$

of the rectangular coordinates $x_k$, $y_k$, $z_k$ of each of the single four-electrode arrangements, the $x_k$-axes being laid into the respective axes of symmetry, and $r_{0k}$ being the respective distances of the surfaces of the single electrode arrangements from the $x$-axes, an adequate plurality of ion sources being arranged in said vessel, means for introducing ions delivered from said ion sources into said vessel and into said cylindrically symmetrical time-periodical fields in direction of the respective axes of symmetry, means for collecting the ions having followed stable paths through the said fields between the said electrode means, said collecting means being arranged in said vessel, means for screening said ion sources and said collecting means with respect to said vessel and means for measuring the current resulting from the charged ions collected by said collecting means, by measuring the voltage created by said current in a resistor.

9. An arrangement as claimed in claim 8, wherein said ion sources and said collecting means are arranged in separate housings, said housing being connected with said vessel in a vacuum-tight manner.

10. An arrangement for separately detecting ions having different specific charges comprising, in combination a vessel capable of being evacuated, three electrodes for creating a rotationally symmetrical electric field in the space between them, said electrodes being arranged in said vessel, adjacent surfaces of said electrodes having a hyperboloidal shape, one of the surfaces of said electrodes being a two-part hyperboloid and the two others each being a one-part hyperboloid, the latter parts being conductively interconnected, means for holding said electrodes in spaced relation, means for generating a voltage being an arbitrary periodical function $f(t)$ of time, means for supplying said voltage to said electrodes and thereby creating a time-periodical, rotationally symmetrical electric field the potential of which is a general function $$\phi = f(t)(x^2 + y^2 - 2z^2)\frac{1}{r_0^2}$$

of the rectangular coordinates $x$, $y$, $z$ of the electrode arrangement, the $z$-axis being laid into the axis of rotational symmetry, the center of symmetry coinciding with the origin of the coordinates, and $r_0$ being the smallest radius of said two-part rotational hyperboloid, means for introducing a gas or vapor to be tested into said vessel at low pressure, incandescent cathode means for emitting electrons able to ionize the gas in the space between said electrodes, said cathode means being arranged in a housing ebing connected with the vessel in a vacuum-tight manner, the emitting surface of said cathode means being located in a hollow part of one of the one-part hyperboloidal electrodes, means for focusing the electrons and passing them into said space through holes in said electrode.

11. An arrangement as claimed in claim 10, comprising means for generating an additional alternating voltage of an amplitude being small as compared with the amplitude of said periodical voltage and of half the frequency of this voltage, and means for superimposing said alternating voltage on the circuit of said periodic voltage, whereby a small range of unstable ion paths is embedded in a broad range of stable paths.

12. Means for separating charged particles having a first and a second specific charge; said means comprising an electrode means and voltage source therefor for creating an electric field within an evacuated vessel; the voltage of said voltage source being a periodic function of time; said electrode means having a configuration to create an electric field $$\varphi = f(t)(\alpha x^2 + \beta y^2 - \gamma z^2)$$

said electric field being directed to force said charged particles having said first specific charge to execute an oscillation having a limited amplitude and to force said charged particles having said second specific charge to execute oscillations having an increasing amplitude.

13. A mass spectrometer as defined in claim 1 for measuring the partial pressures of a highly rarified gas mixture including means for ionizing and introducing said highly rarified gas into said mass spectrometer, said partial pressure being determined by measuring the concentration of the individual components of said mixture.

14. The apparatus of claim 1 for detecting a leak in a vacuum device, said apparatus being positioned to measure partial pressures within said vacuum device, said apparatus measuring the partial pressure of a predetermined gas entering said vacuum device through a leak.

15. A mass spectrometer as defined in claim 1 for separating a gas mixture including means for ionizing and introducing said mixture into said mass spectrometer, the components of said mixture being separated in accordance with the specific charge of their respective ions.

16. A mass spectrometer as defined in claim 1 for separating a gas mixture in the vapor phase including means for ionizing and introducing said mixture into said mass spectrometer, the components of said mixture being separated in accordance with the specific charge of their respective ions.

17. A mass spectrometer as defined in claim 1 for analyzing traces of elements present in an atmosphere, said atmosphere being ionized and inserted into said mass spectrometer, said mass spectrometer separating the ions of said elements and measuring their respective quantities.

References Cited in the file of this patent
UNITED STATES PATENTS

| 2,615,135 | Glenn | Oct. 21, 1952 |
| 2,627,034 | Washburn et al. | Jan. 27, 1953 |
| 2,769,910 | Elings | Nov. 6, 1956 |

OTHER REFERENCES

"A New Mass Spectrometer," by Smythe et al., Physical Review, vol. 40, May 1, 1932, pages 429 to 433.